E4819 OR 3,749,854

United State

Mifune et al.

[11] 3,749,854

[45] July 31, 1973

[54] ULTRASONIC WAVE MICROPHONE

[75] Inventors: Hideo Mifune, Hirakata; Kenroku Tani, Osaka, both of Japan

[73] Assignee: Matsushita Electric Industrial Co., Ltd., Osaka, Japan

[22] Filed: Apr. 18, 1972

[21] Appl. No.: 245,284

Related U.S. Application Data

[62] Division of Ser. No. 39,214, May 21, 1970, Pat. No. 3,675,053.

[30] Foreign Application Priority Data

| | | |
|---|---|---|
| May 26, 1969 | Japan | 44/41224 |
| June 10, 1969 | Japan | 44/46665 |
| May 26, 1969 | Japan | 44/49112 |
| June 27, 1969 | Japan | 44/62368 |
| June 27, 1969 | Japan | 44/62370 |
| Jan. 9, 1969 | Japan | 44/96640 |

[52] U.S. Cl. ............... 179/110 A, 310/8.2, 310/8.6, 310/9.4, 310/9.5

[51] Int. Cl. ....................... H04r 17/02, H04r 17/10

[58] Field of Search ................. 179/110 A; 310/8.6, 310/8.2, 9.1, 9.4; 340/10

*Primary Examiner*—William C. Cooper
*Assistant Examiner*—Thomas L. Kundert
*Attorney*—Robert J. Frank

[57] ABSTRACT

An ultrasonic wave microphone which comprises a flat piezo-electric vibrator and a funnel-like appendant resonator formed of a metal having a high Q and connected to the piezo-electric vibrator at the center thereof so that electrical characteristics of the microphone can be varied, and which is especially useful for a remote control device or the like for a television set.

1 Claim, 21 Drawing Figures

T 310 367

FIG. 1
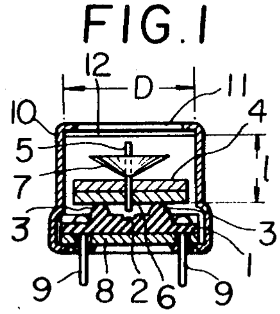
FIG. 2
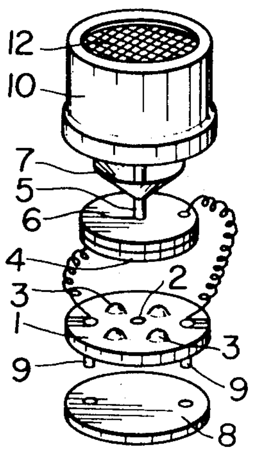
FIG. 3
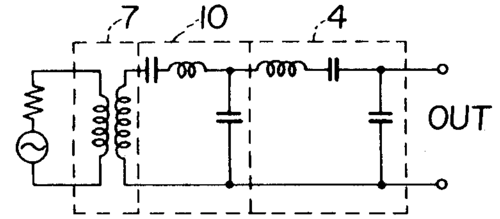
FIG. 4
FIG. 6
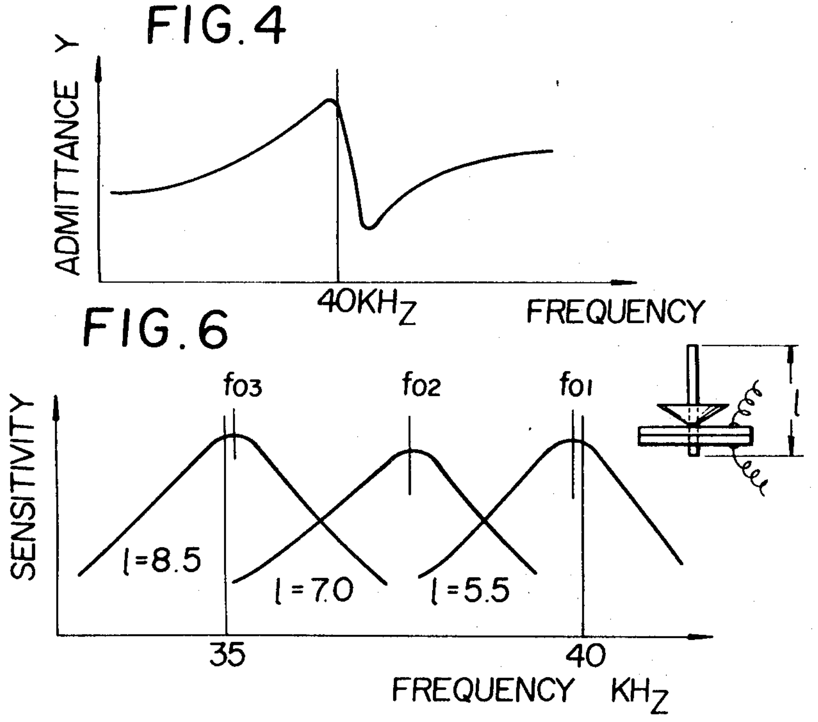

ULTRASONIC WAVE MICROPHONE

This is a division, of application Ser. No. 39,214, filed May 21, 1970, and now U.S. Pat. No. 3,675,053.

This invention relates to an ultrasonic wave microphone which comprises a flat piezo-electric vibrator and a funnel-like appendant resonator formed of a metal having a high Q and connected to the piezo-electric vibrator at the center thereof.

It is an object of the present invention to provide an ultrasonic wave microphone whose electrical characteristics may be adjusted with great ease and accuracy.

It is another object of the present invention to provide an ultrasonic wave microphone which is simple in construction and high in sensitivity and which can have characteristics adapted to different band widths.

It is still another object of the present invention to provide an ultrasonic wave microphone which has a wide band width and is compact and easy to manufacture.

The invention will now be described in detail with respect to various embodiments thereof shown in the accompanying drawings, in which:

FIG. 1 is a cross-sectional side view of a basic form of the ultrasonic wave microphone according to the present invention;

FIG. 2 is a developed perspective view of the ultrasonic wave microphone shown in FIG. 1;

FIG. 3 shows the equivalent circuit of the aforesaid microphone;

FIG. 4 is a graph illustrating the admittance characteristic of the same microphone;

FIG. 6 shows the relation between the length of the connecting shaft and the sensitivity;

Figure 5A:
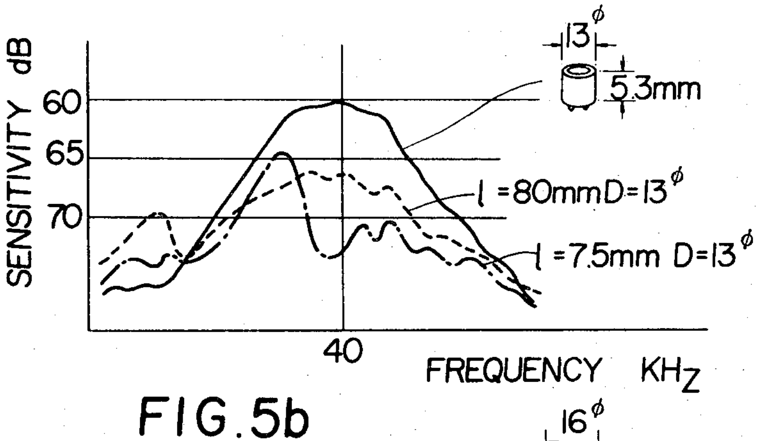
FIGS. 5a to 5c are graphs illustrating the relation between the size of the casing of the microphone and the sensitivity characteristic thereof.

Referring to FIGS. 1 to 3, there is shown a basic form of the ultrasonic wave microphone according to the present invention, which includes a terminal plate 1 having a center recess 2 formed in the upper surface thereof and dimensioned as desired, and a plurality of protrusions 3 formed around the center recess 2. A disc-like piezo-electric vibrator 4 is supported on the terminal plate 1 with the underside thereof joined to the upper ends of the protrusions 3 of the terminal plate 1 by means of an elastic bonding agent. The piezo-electric vibrator 4 has an aperture 6 formed centrally thereof and through the aperture 6 a connecting shaft 5 is extended and bonded to the inner wall of that aperture. A funnel-like appendant resonator 7 formed of a metal such as aluminium or the like having a high Q is mounted on the connecting shaft 5 above the piezo-electric vibrator 4. A shield plate 8 is attached to the underside of the terminal plate by means of terminals 9 passing through the terminal plate 1 and shield plate 8. A casing 10 having a lower open end houses therein the assembly and the lower open end portion of the casing 10 is securely fitted to the circumference of the terminal plate 1. The casing 10 has an opening 11 formed at the upper end thereof and is covered thereacross by a protective screen 12. All parts of the assembly are in concentric relationship with one another.

The piezo-electric vibrator 4 comprises a pair of disc-like ceramic vibrator elements joined together in face-to-face relationship and polarized in opposed directions to each other.

According to this basic embodiment, as will be described hereunder, the sensitivity characteristic can be greatly varied by varying the size of the casing 10, the length of the connecting shaft 5, the shape of the appendant resonator 7, etc. It is also possible to adjust the admittance characteristic as desired, by varying the size of the appendant resonator 7.

Figure 5B:
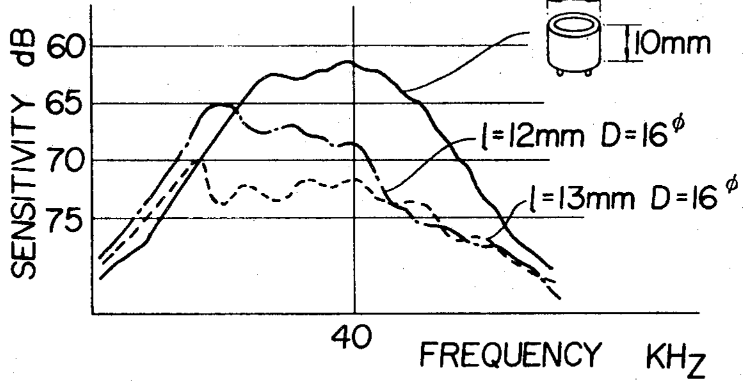
Figure 5C:
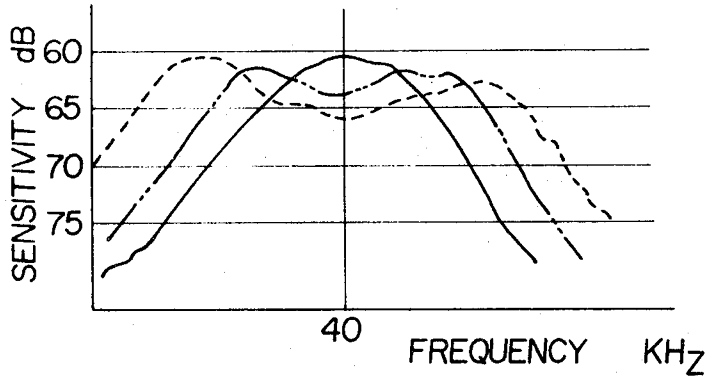
Figure 7:
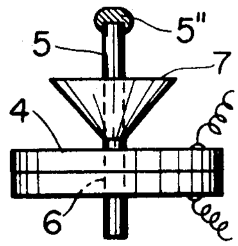
FIG. 7 is a side view showing means for varying the length of the connecting shaft.

FIGS. 5a, 5b and 5c illustrate the relation between the size of the casing 10 and the sensitivity characteristic of the ultrasonic wave microphone in the shown basic form. By varying the size of the casing 10, the sensitivity characteristic can be greatly varied as shown in FIGS. 5a and 5b. Also, by slightly deviating the resonance frequency of the piezo-electric vibrator 4 itself from that of the casing 10, it is possible to provided an ultrasonic wave microphone having a high sensitivity over a wide range as shown in FIG. 5c. FIG. 6 shows the relation between the length of the connecting shaft 5 and the sensitivity of the microphone. By selecting the length $l$ of the connecting shaft 5 to be 8.5 mm, 7.0 mm and 5.0 mm, the center frequency $f_0$ thereof varies to $f_{03}$, $f_{02}$ and $f_{01}$ respectively, thus resulting in the according variations in the frequency characteristic of the ultrasonic wave microphone, as shown.

In this case, the length $l$ of the connecting shaft 5 may be varied by applying solder or other bonding agent 5'' to the upper end of the connecting shaft 5, whereby the adjustment of the length $l$ can be simplified.

Figure 8:
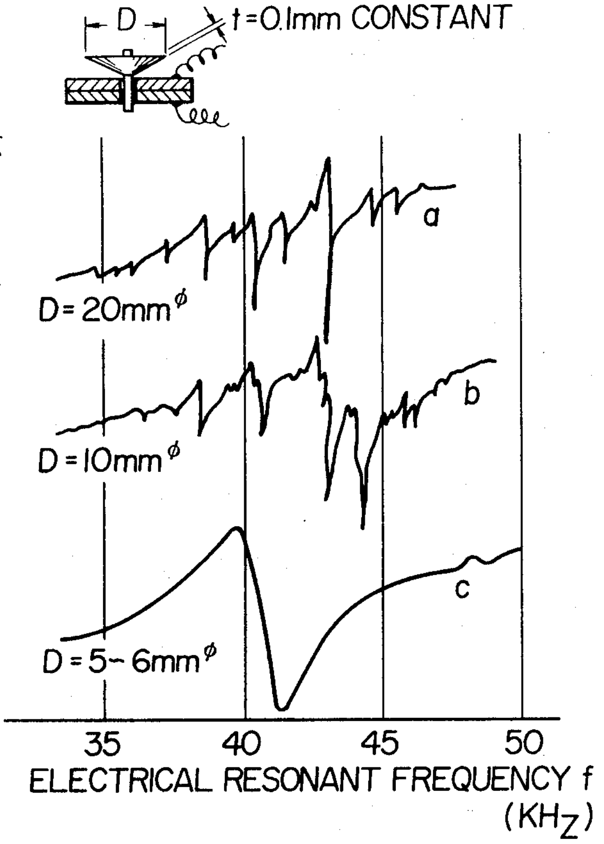
FIG. 8 shows the relation between the diameter of the appendant resonator and the admittance characteristic.
Figure 9:
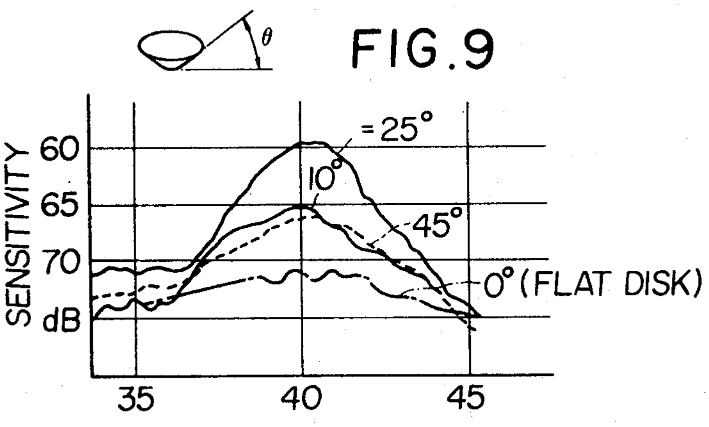
FIG. 9 shows the relation between the shape of the appendant resonator and the sensitivity characteristic.

FIG. 8 illustrates the admittance characteristic obtained with the varied diameter of the additional oscillator 7. As will be seen, if the diameter of the appendant resonator 7 is varied to be 20 mm, 10 mm and 5–6 mm, the admittance characteristic is also varied as shown by (a), (b) and (c) respectively. FIG. 9 illustrates the sensitivity characteristic obtained with different shapes of the appendant resonator 7, and it is seen that variation in the shape of the resonator also results in a great variation of the sensitivity characteristic of the microphone.

Figure 10:
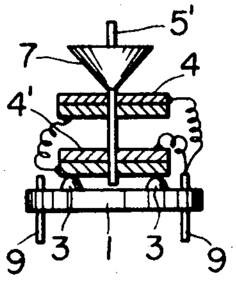
FIG. 10 is a side view showing another form of the present invention with the casing removed.
Figure 11:
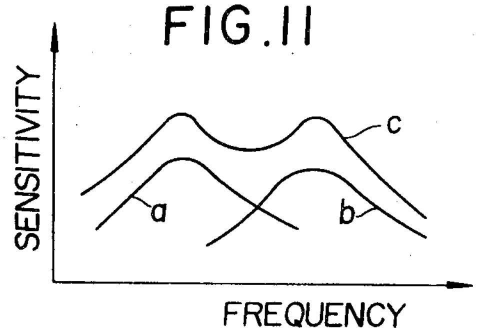
FIG. 11 is a graph illustrating the sensitivity characteristic obtained by the microphone of FIG. 10.
Figure 12:
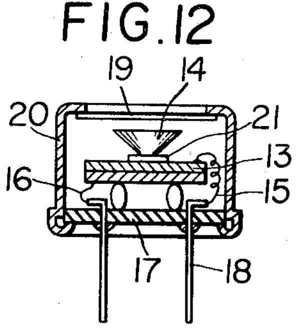
FIG. 12 is a side view showing still another form of the present invention obtained by simplifying the arrangement of FIGS. 1 and 2.
Figure 13:
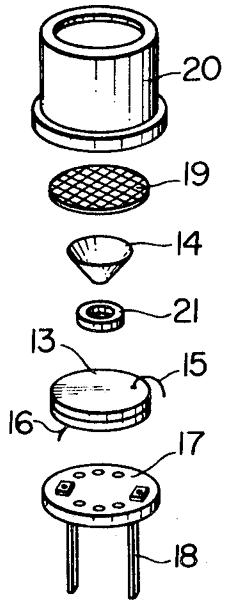
FIG. 13 is a developed perspective view of the FIG. 12 embodiment.

Referring to FIG. 10, there is shown another form of the present invention in which a plurality of piezo-electric vibrators 4, 4' are mechanically connected together by means of a rod-like connecting shaft 5' extending through these vibrators at the center thereof. In this embodiment, by varying the center frequency in the piezo-electric vibrators 4, 4' as shown in FIG. 11, there can be provided a double-peak sensitivity characteristic as shown by curve *c*. FIG. 12 is a cross-sectional side view showing a simplified form of the ultrasonic wave microphone shown in FIGS. 1 and 2. FIG. 13 is a developed perspective view of the ultrasonic wave microphone shown in FIG. 12.

Referring to FIGS. 12 and 13, use is made of a bimorph type piezo-electric vibrator 13 comprising a pair of disc-like ceramic vibrator elements joined together in face-to-face relationship. The mode of vibration of the piezo-electric vibrator 13 is such that vibration is obtained by utilizing higher harmonics (most effectively, the first higher harmonic) in the deflective vibration of the ceramic vibrator elements. A funnel-like appendant resonator 14 formed of aluminium or like metal having a high Q overlies the piezo-electric vibrator 13, with the apex thereof joined to the underlying piezo-electric vibrator 13 at the center thereof through a ring-like connector element 21 of insulating material, for example, by a bonding agent. Output lead wires 15 and 16 are connected with the opposed electrodes in the piezo-electric vibrator 13, which is fixedly supported on a terminal plate 17 by means of an elastic bonding agent. Numeral 18 designates a pair of terminals, and 19 a screen provided across the upper opening of a casing 20.

Figure 14:
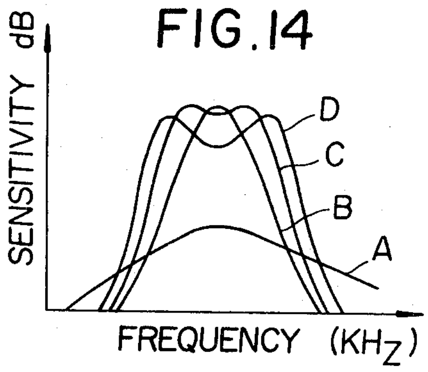
FIG. 14 is a graph illustrating the relation between the coefficient of coupling of the piezo-electric vibrator with the appendant resonator and the sensitivity characteristic in the FIG. 13 embodiment.
Figure 15:
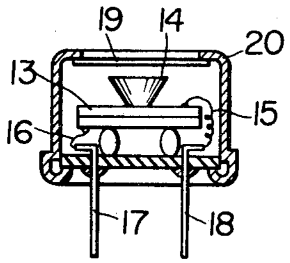
FIG. 15 is a cross-sectional side view showing another form of the invention provided by simplifying the embodiment of FIGS. 12 and 13.

With the ultrasonic wave microphone of FIGS. 12 and 13, the sensitivity characteristic of the piezo-electric vibrator 13 per se with respect to an ultrasonic wave signal is relatively low. However, such sensitivity characteristics can be greatly improved by joining the appendant resonator 14 to the piezo-electric vibrator 13 and varying the mass, shape and other factors thereof as well as the condition and the coefficient of coupling therebetween. The sensitivity characteristic obtained with varied coefficient of coupling between the piezo-electric vibrator 13 and the appendant resonator 14 is illustrated in FIG. 14, wherein curve A represents the sensitivity characteristic of the piezo-electric vibrator 13 alone, and curves B, C and D respectively represent the sensitivity characteristics corresponding to three different coefficients of coupling between the piezo-electric vibrator 13 and the additional oscillator 14, B being the lowest coefficient and D for the highest. A simpler form of the FIGS. 12–13 ultrasonic wave microphone is shown in FIG. 15, wherein the connector element 21 of FIGS. 12–13 is eliminated and the apex of an oscillator 21 is directly joined to the piezo-electric vibrator 13 at the center thereof.

Figure 16:
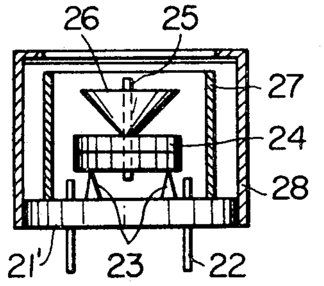
FIG. 16 is a cross-sectional side view showing a modification of the FIG. 1 embodiment.

Referring to FIG. 16, there is shown an ultrasonic wave microphone improved over the FIG. 1 embodiment. This alternative embodiment employs a cylindrical resonator surrounding the piezo-electric vibrator.

Figure 17:
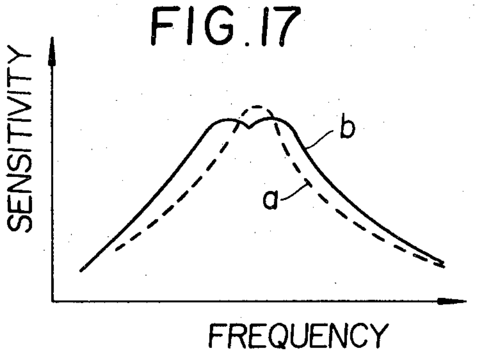
FIG. 17 is a graph illustrating the sensitivity characteristic obtained by the FIG. 16 embodiment.

In FIG. 16, the microphone includes a terminal plate 21, a pair of terminals 22 studied through the terminal plate 21, a vibrator-mounting protrusions 23 formed on the upper surface of the terminal plate 21, a ceramic vibrator 24 resting on the protrusions 23, a connecting shaft 25 passing through the center of the vibrator 24 and fixed thereto, a funnel-like resonator 26 mounted on the connecting shaft 25, a cylindrical resonator 27 mounted on the terminal plate 21 so as to surround the ceramic vibrator 24, and a casing 28 housing the assembly. With the arrangement of FIG. 16, the cylindrical resonator 27 acts to control the standing wave oscillation in the casing, and as shown in FIG. 17, the single-peak sensitivity characteristic a can be varied to the double-peak characteristic *b* so as to provide a wider band.

Figures 18, 19:
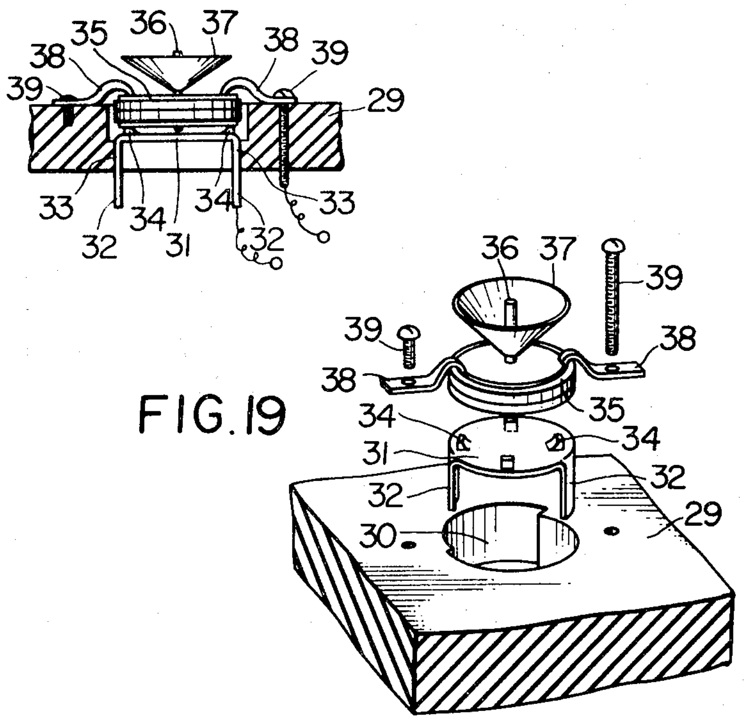
FIG. 18 is a cross-sectional side view showing still another form of the invention with the casing removed.
FIG. 19 is a developed perspective view of the FIG. 18 embodiment.

FIG. 18 is a cross-sectional side view showing an example of the invention in which the piezo-electric element is mounted on the terminal plate. FIG. 19 shows such an example in a developed perspective view.

The embodiment of FIGS. 18–19 includes a terminal plate 29 having a recess 30 formed in the upper surface thereof, a disc-like supporting plate 31 mounted on the bottom of the recess 30, a pair of terminals 32 formed integrally with the supporting plate 31 and extended downwardly through holes 33 formed in the terminal plate 29, a pair of tongues 34 formed by punching in the supporting plate 31 in diametrically opposite relationship with each other, a piezo-electric vibrator 35 supported on the supporting plate 31 by means of tongues 34, a connecting shaft 36 passing through the center of the piezo-electric vibrator 35 and secured thereto, a funnel-like resonator 37 fixedly mounted on the corresponding shaft 36, and a pair of supporting members 38 mounted by means of screws 39 on the upper surface of the terminal plate 29 and having their respective inner ends adapted to resiliently press the upper surface of the piezo-electric oscillator. Each of the supporting members 38 is rotatable about the screw 39 so that the ceramic vibrator 35 may be removably mounted.

As has been disclosed above, the ultrasonic wave microphone of the present invention can have its sensitivity characteristic made adjustable, by varying the size of the casing, the length of the connecting shaft, the shape of the appendant resonator and the coefficient of coupling between the piezo-electric vibrator and the appendant resonator as well as by the addition of the cylindrical resonator. Thus, suitable selection of these factors leads to an excellent sensitivity characteristic of the microphone.

Further, according to the present invention, the ultrasonic wave microphone can be simply constructed by connecting the funnel-like appendant resonator to the piezo-electric vibrator, and this means greater ease and economic advantages in manufacture.

What we claim is:

1. An ultrasonic wave microphone comprising a terminal plate having a recess formed in the upper surface thereof, a supporting plate having a plurality of tongues formed in the mid portion thereof, said supporting plate being securely received in said recess formed in said terminal plate, a piezo-electric vibrator resting on said supporting plate, a funnel-like appendant resonator connected to and supported by only said piezo-electric vibrator at the center thereof, and holding members mounted on the upper surface of said terminal plate so as to resiliently press the upper surface of said piezo-electric vibrator.

* * * * *